United States Patent Office 2,862,936
Patented Dec. 2, 1958

2,862,936

21-FLUORO-STEROIDS AND METHOD OF MAKING SAME

Frank H. Lincoln, Jr., and William P. Schneider, Kalamazoo Township, Kalamazoo County, Mich., assignors to The Upjohn Company, Kalamazoo, Mich., a corporation of Michigan No Drawing. Application May 4, 1956
Serial No. 582,666

5 Claims. (Cl. 260—397.45)

The present invention relates to novel steroid compounds and is more particularly concerned with 11β,17α-dihydroxy-21-fluoro-1,4-pregnadiene-3,20-dione, 17α-hydroxy-21-fluoro-1,4-pregnadiene-3,11,20-trione and a process for the production thereof.

The compounds and the process of the instant invention may be illustratively represented by the formulae:

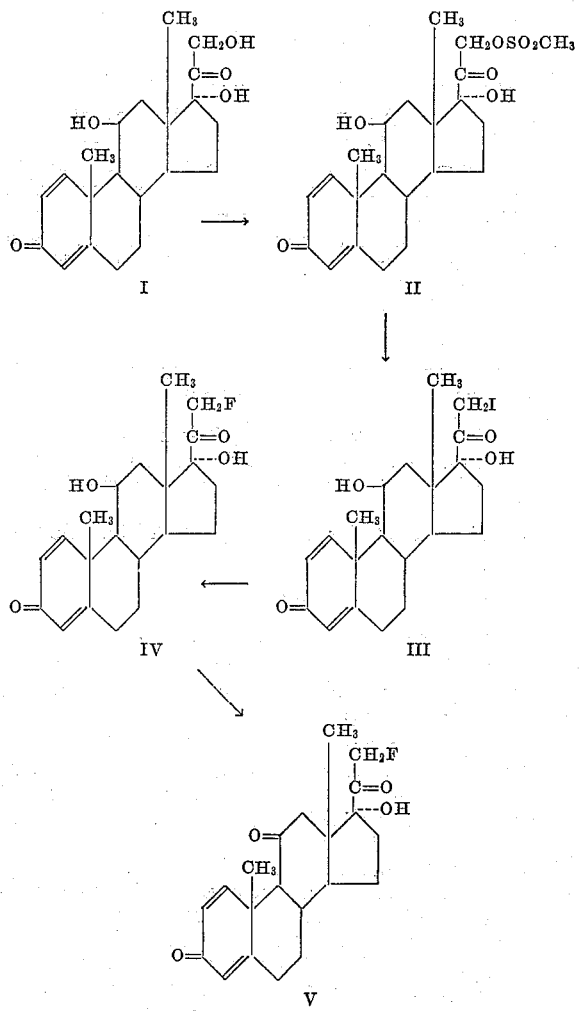

The process of the instant invention comprises: reacting 11β,17α,21-trihydroxy-1,4-pregnadiene-3,20-dione (1-dehydro-hydrocortisone) (I) with methanesulfonyl chloride to obtain the 21-methanesulfonate of 11β,17α,21-trihydroxy-1,4-pregnadiene-3,20-dione (II); treating the thus obtained 21-methanesulfonate (II) with an alkali metal iodide, e. g., sodium or potassium iodide in acetone to obtain 11β,17α-dihydroxy-21-iodo-1,4-pregnadiene-3,20-dione (III); and treating the thus obtained 21-iodo compound (III) with silver fluoride in acetonitrile solution to obtain the desired 11β,17α-dihydroxy-21-fluoro-1,4-pregnadiene-3,20-dione (IV). Oxidation of 11β,17α-dihydroxy-21-fluoro-1,4-pregnadiene-3,20-dione (IV) with chromic acid (chromic anhydride or an alkali metal dichromate) yields 17α-hydroxy-21-fluoro-1,4-pregnadiene-3,11,20-trione (V).

It is an object of the present invention to provide 11β,17α-dihydroxy-21-fluoro-1,4-pregnadiene-3,20-dione and 17α-hydroxy-21-fluoro-1,4-pregnadiene-3,11,20-trione. It is another object of the instant invention to provide the intermediates for this reaction such as the 21-methanesulfonate of 1-dehydrocortisone, 11β,17α-dihydroxy-21-iodo-1,4-pregnadiene-3,20-dione and the corresponding 11-keto analogues. It is another object of the instant invention to provide a process for the production of these 11-oxygenated-17α-hydroxy - 21 - fluoro-1,4-pregnadiene, 3,20-diones and the intermediates therefore. Other objects of the present invention will be apparent to those skilled in the art to which this invention pertains.

The novel compounds, 11β,17α-dihydroxy-21-fluoro-1,4-pregnadiene-3,20-dione and 17α-hydroxy-21-fluoro-1,4-pregnadiene-3,11,20-trione are compounds having anti-inflammatory, glucocorticoid and anti-arthritic activity without producing salt retention. These compounds are therefore highly suitable in the treatment of arthritic patients or for the treatment of inflammatory conditions of skin, nose, ear or eye in form of ointments or drops in the manner known in the art. Having no salt retention the compounds are particularly desirable and superior to many of the other adrenocortical hormones.

The starting material for the present process is 1-dehydro-hydrocortisone (11β,17α,21-trihydroxy-1,4-pregnadiene-3,20-dione).

In carrying out the process of the present invention 11β,17α,21-trihydroxy-1,4-pregnadiene-3,20-dione is reacted with an excess of methanesulfonyl chloride usually at low temperature between minus ten and plus ten degrees in a solvent such as, for example, pyridine, benzene, toluene, hexane, or the like, with pyridine preferred. The time of reaction is usually between one half hour and six hours. When the reaction is terminated the reaction mixture is reacted with excess of water and the precipitated product collected on filter. The thus produced 21-methanesulfonate of 11β,17α,21-trihydroxy-1,4-pregnadiene-3,20-dione can be purified by recrystallization from organic solvents such as acetone, methanol, Skellysolve B hexanes, heptanes, or the like, or any mixtures thereof. For the purpose of the subsequent reactions, however, it is not necessary to purify the thus-obtained 21-methanesulfonate of 11β,17α,21-trihydroxy-1,4-pregnadiene-3,20-dione (21-methanesulfonate of 1-dehydro-hydrocortisone).

The conversion of the methanesulfonate of 1-dehydro-hydrocortisone (II) to the 21-iodo compound, 11β,17α-dihydroxy-21-iodo-1,4-pregnadiene-3,20-dione (III), is carried out by reacting the 21-methanesulfonate of 1-dehydro-hydrocortisone with an alkali metal iodide such as sodium or potassium iodide in a solvent, preferably acetone. The acetone solution is generally heated to reflux for a period of a few minutes to one hour, however, the reaction is operative at lower temperatures between twenty degrees and the refluxing temperature of the acetone solution using, of course, at the lower temperatures a correspondingly longer reaction time. At the end of the reaction, free iodine is eliminated by the addition of a thiosulfate such as sodium or potassium thiosulfate. Simultaneous addition of excess of water precipitates the product, 11β,17α-dihydroxy-21-iodo-1,4-pregnadiene-3,20-dione which is recovered from the reaction mixture by filtration. The 11β,17α-dihydroxy-21-iodo-1,4-pregnadiene-3,20-dione is washed with water and air dried, and thus can be utilized for the subsequent reaction or alternatively can be first purified by recrystallization from organic solvents such as acetone, hexanes, heptanes, methanol, ethanol, benzene, or the like.

The thus obtained 21-iodo compound, 11β,17α-dihydroxy-21-iodo-1,4-pregnadiene-3,20-dione, dissolved in a suitable solvent such as acetonitrile, hexanes, heptanes, benzene, tertiary butyl alcohol, or the like with acetonitrile preferred, is reacted with silver fluoride. The reaction is usually carried out under exclusion of light and with stirring. The preferred form of silver fluoride used is a fifty percent aqueous silver fluoride solution rather than solid silver fluoride. The reaction is preferably carried out between forty to sixty degrees centigrade, however, lower or higher temperatures between ten and about 75 degrees centigrade are operative. Since the silver iodide produced in the reaction forms a molecular compound with silver fluoride, two moles of silver fluoride must be used per mole of steroid as the minimum amount necessary for theoretical recovery. However, it is preferred to use an even greater amount, between ten to fifty percent over and above the calculated amount, in order to obtain higher yields. The silver fluoride is usually added in portions over a period of time. The reaction time ranges usually from one half to six hours. In order to isolate the product the solvent is evaporated and the crude product extracted with a suitable solvent such as chloroform, methylene chloride, carbon tetrachloride, benzene, or the like. Purification is made by conventional procedures such as additional extraction to eliminate impurities, recrystallization or chromatography, as deemed necessary.

In order to obtain 21-fluoro-17α-hydroxy-1,4-pregnadiene-3,11,20-trione the 21-fluoro-11β,17α-dihydroxy-1,4-pregnadiene-3,20-dione is oxidized preferably with chromic anhydride or sodium or potassium dichromate in acetic acid solution. Small amounts of water should be present in the acetic acid in order to facilitate the reaction. The amount of chromic anhydride or sodium dichromate necessary is from one to one and one half times the theoretical calculated amount. However larger amounts are operative. The temperature of the reaction is between zero degrees and fifty degrees, with a temperature about room temperature, twenty to thirty degrees centigrade, preferred. The time of reaction is between one half hour and six hours depending upon the temperature selected. At the end of the oxidation reaction, the excess of oxidant is usually destroyed by adding an excess of alcohol such as methanol or ethanol. The reaction mixture is thereupon poured into excess of water and the product extracted with a water-immiscible solvent such as methylene chloride, ethylene dichloride, chloroform, carbon tetrachloride, benzene, toluene, heptanes, hexanes, ether, or the like. The extracts are thereupon evaporated and the crude product purified in conventional manner such as by recrystallization, and/or chromatography.

Another method to obtain 21-fluoro-17α-hydroxy-1,4-pregnadiene-3,11,20-trione is to submit 1-dehydrocortisone to the same sequence of reactions as the 1-dehydrohydrocortisone, that is esterification with methanesulfonyl chloride to obtain the 21-methanesulfonate of 17α,21-dihydroxy-1,4-pregnadiene-3,11,20-trione; treating the 21-methanesulfonate with an alkali metal iodide such as sodium or potassium iodide in a suitable solvent such as acetone to obtain the corresponding 17α-hydroxy-21-iodo-1,4-pregnadiene-3,11,20-trione and reacting the thus obtained 21-iodo compound with silver fluoride in acetonitrile to obtain 17α-hydroxy-21-fluoro-1,4-pregnadiene-3,11,20-trione.

The following examples are illustrative of the process and products of the present invention, but are not to be construed as limiting.

EXAMPLE 1

*1-dehydro-hydrocortisone 21-methanesulfonate (21-methanesulfonate of 11β,17α,21-trihydroxy-1,4-pregnadiene-3,20-dione)*

A solution of five grams (13.8 millimoles) of 1-dehydro-hydrocortisone, dissolved in 35 milliliters of pyridine, was cooled to zero degrees and thereto was added 1.5 milliliters (19 millimoles) of methanesulfonyl chloride under stirring. The stirring was continued for a period of two hours at zero degree centigrade whereafter 200 milliliters of water was added. The precipitated product was collected on a filter, washed with water, and air-dried to give 5.8 grams (96 percent) of a white powder. Recrystallization of part of the white powder from acetone-Skellysolve B hexanes gave fluffy white needles of 1-dehydro-hydrocortisone 21-methanesulfonate of melting point 193 to 194 degrees centigrade (decomposition).

Analysis.—Calcd. for $C_{22}H_{30}O_7S$: C, 60.25; H, 6.90; S, 7.31. Found: C, 60.49; H, 7.10; S, 7.07.

EXAMPLE 2

*11β,17α-dihydroxy-21-iodo-1,4-pregnadiene-3,20-dione*

A solution of 5.2 grams (18.8 millimoles) of crude 21-methanesulfonate of 11β,17α,21-trihydroxy-1,4-pregnadiene-3,20-dione in 120 milliliters of boiling acetone was treated with a solution of 5.2 grams of sodium iodide in fifty milliliters of acetone. The mixture was stirred at the boiling point for a period of twelve minutes, and thereupon concentrated to approximately one half volume. After cooling to room temperature, a cold solution of 0.75 gram of sodium thiosulfate in 250 milliliters of water was added. The mixture was further chilled to a temperature of about five degrees and then filtered. The ivory-colored, crystalline product, 11β,17α-dihydroxy-21-iodo-1,4-pregnadiene-3,20-dione was washed with water and air dried. The yield of 11β,17α-dihydroxy-21-iodo-1,4-pregnadiene-3,20-dione was 5.54 grams (97 percent), melting point 158 to 161 degrees centigrade with decomposition.

Analysis.—Calcd. for $C_{21}H_{27}O_4I$: I, 26.99. Found: I, 26.50.

EXAMPLE 3

*11β,17α-dihydroxy-21-fluoro-1,4-pregnadiene-3,20-dione*

A solution of four grams (8.45 millimoles) of 11β,17α-dihydroxy-21-iodo-1,4-pregnadiene-3,20-dione in 800 milliliters of acetonitrile (practical grade) was prepared by heating to the boiling point. After cooling to fifty degrees centigrade the solution was protected from light and three milliliters of fifty percent aqueous solution of silver fluoride was added under stirring. The solution became cloudy and brown colored. The addition of a little water did not redissolve the insoluble material. Under continued stirring at a temperature between 40 to 45 degrees centigrade, additional silver fluoride solution was added in two five-milliliter portions, thirty minutes apart. Heating and stirring was then continued for a period of two hours. The brown mixture was thereupon filtered through a bed of Celite diatomaceous earth and the filtrate evaporated at reduced pressure from a bath at a temperature of fifty degrees centigrade. The brown residue was thoroughly extracted with four one-hundred-milliliter portions of warm methylene chloride, the methylene chloride extracts concentrated to approximately 250 milliliter volume and chromatographed over 150 grams of Florisil synthetic magnesium silicate. Fractions of 200 milliliters were taken as follows:

TABLE I

| Fractions | Solvent |
|---|---|
| 1–5 | Hexane-acetone 90:10. |
| 6–15 | Hexane-acetone 875:125. |
| 16–25 | Hexane-acetone 85:15. |
| 26 | Hexane-acetone 80:20. |
| 27 | Hexane-acetone 80:20. |
| 28 | Acetone 100 percent. |

The hexane mixture used was Skellysolve B hexanes. Fractions 17 to 26 were combined and evaporated to give 634 milligrams of crystals which after recrystallization from acetone-Skellysolve B (yield 480 milligrams) melted at 242 to 245 degrees centigrade. Recrystallization from the same solvents gave fine prisms of 11β,17α-dihydroxy-21-fluoro-1,4-pregnadiene-3,20-dione of melting point 244 to 246 degrees centigrade and rotation $[\alpha]_D$ plus 96 degrees in 95 percent ethanol.

*Analysis.*—Calcd. for $C_{21}H_{27}O_4F$: C, 69.59; H, 7.51; F, 5.24. Found: C, 69.71; H, 7.64; F, 4.59.

The acetone strip fraction 28 contained 1.30 grams of material which was rechromatographed to give additionally 260 milligrams of 11β,17α-dihydroxy-21-fluoro-1,4-pregnadiene-3,20-dione. A total of 0.74 gram (24.2 percent) of 11β,17α-dihydroxy-21-fluoro-1,4-pregnadiene-3,20-dione was obtained.

EXAMPLE 4

*17α-hydroxy-21-fluoro-1,4-pregnadiene-3,11,20-trione*

A solution was prepared containing 200 milligrams of 11β,17α-dihydroxy-21-fluoro-1,4-pregnadiene-3,20-dione and 55 milligrams of chromic anhydride in ten milliliters of acetic acid and one milliliter of water. This solution was allowed to stand at room temperature, about 25 degrees centigrade, for a period of three hours while occassionally being shaken. To this mixture was then added one milliliter of methanol, whereafter the total mixture was poured into 100 milliliters of water. The thus obtained aqueous solution was extracted with four fifty-milliliter portions of methylene chloride, the methylene chloride extracts were washed with water, dried over anhydrous sodium sulfate, evaporated and the residue three times recrystallized from a mixture of Skellysolve B hexanes and acetone to give pure 17α-hydroxy-21-fluoro-1,4-pregnadiene-3,11,20-trione. Infrared anaylsis in chloroform confirmed the proposed structure.

In the same manner as shown in Example 1, substituting the 11β,17α,21-trihydroxy-1,4-pregnadiene-3,20-dione by 17α,21-dihydroxy-1,4-pregnadiene-3,11,20-trione gave the 21-methanesulfonate of 1-dehydrocortisone; substituting the 21-methanesulfonate of 1-dehydro-hydrocortisone in Example 2 with 21-methanesulfonate of 1-dehydrocortisone (17α,21-dihydroxy-1,4-pregnadiene-3,11,20-trione 21-methanesulfonate) yielded 17α-hydroxy-21-iodo-1,4-pregnadiene-3,11,20-trione; reacting the thus obtained 17α-hydroxy-21-iodo-1,4-pregnadiene-3,11,20-trione with silver fluoride as shown in Example 3 yielded the corresponding 17α-hydroxy-21-fluoro-1,4-pregnadiene-3,11,20-trione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of 11β,17α-dihydroxy-21-fluoro-1,4-pregnadiene-3,20-dione and 17α-hydroxy-21-fluoro-1,4-pregnadiene-3,11,20-trione.

2. 11β,17α-dihydroxy-21-fluoro-1,4-pregnadiene-3,20-dione.

3. 17α-hydroxy-21-fluoro-1,4-pregnadiene-3,11,20-trione.

4. A process for the production of 11β,17α-dihydroxy-21-fluoro-1,4-pregnadiene-3,20-dione which comprises: esterifying 11β,17α,21-trihydroxy-1,4-pregnadiene-3,20-dione with methanesulfonyl chloride to obtain the 21-methanesulfonate of 11β,17α-21-trihydroxy-1,4-pregnadiene-3,20-dione, treating the thus obtained 21-methanesulfonate of 11β,17α,21-trihydroxy-1,4-pregnadiene-3,20-dione with an alkali metal iodide in acetone to obtain 11β,17α-dihydroxy-21-iodo-1,4-pregnadiene-3,20-dione and treating the thus obtained iodo compound with silver fluoride in acetonitrile to obtain 11β,17α-dihydroxy-21-fluoro-1,4,pregnadiene-3,20-dione.

5. A process for the production of 17α-hydroxy-21-fluoro-1,4-pregnadiene-3,11,20-trione which comprises: treating 11β,17α,21-trihydroxy-1,4-pregnadiene-3,20-dione with methanesulfonyl chloride to obtain the corre- 1,4-pregnadiene-3,20-dione; treating the thus obtained 21-methanesulfonate of 11β,17α,21-trihydroxy-1,4-pregnadiene-3,20-dione with an alkali-metal iodide in acetone solution to obtain 11β,17α-dihydroxy-21-iodo-1,4-pregnadiene-3,20-dione; treating the thus produced 11β,17α-dihydroxy-21-iodo-1,4-pregnadiene-3,20-dione with silver fluoride in acetonitrile solution to obtain 11β,17α-dihydroxy-21-fluoro-1,4-pregnadiene-3,20-dione, and oxidizing with chromic acid the thus obtained 11β,17α-dihydroxy-21-fluoro-1,4-pregnadiene-3,20-dione to obtain 17α-hydroxy-21-fluoro-1,4-pregnadiene-3,11,20-trione.

No references cited.

UNITED STATES PATENT OFFICE

Certificate of Correction

Patent No. 2,862,936

December 2, 1958

Frank H. Lincoln, Jr., et al.

It is hereby certified that error appears in the printed specification of the above numbered patent requiring correction and that the said Letters Patent should read as corrected below.

Column 2, line 19, for "pregnadiene," read —pregnadiene-—; column 6, lines 39 and 40, for "corre-1,4-pregnadiene" read —corresponding 21-methanesulfonate of 11β,17α,21-trihydroxy-1,4-pregnadiene—.

Signed and sealed this 30th day of June 1959.

[SEAL]

Attest:
KARL H. AXLINE,
*Attesting Officer.*

ROBERT C. WATSON,
*Commissioner of Patents.*